July 14, 1925.
H. K. PARSONS
TRIAL FRAME
Filed July 29, 1919    2 Sheets-Sheet 1
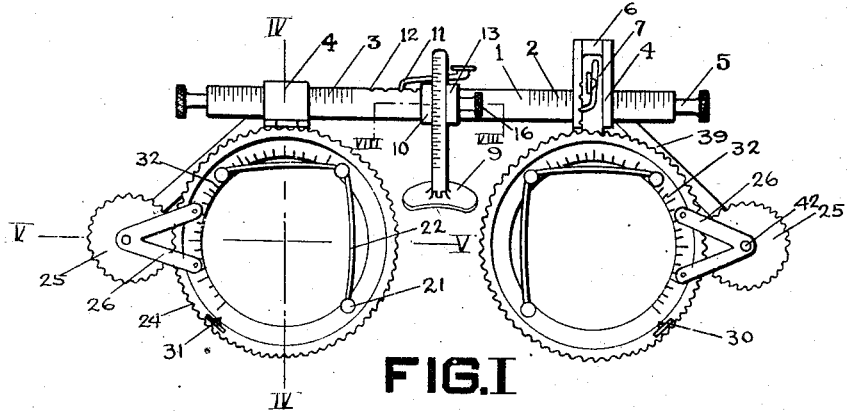
FIG. I
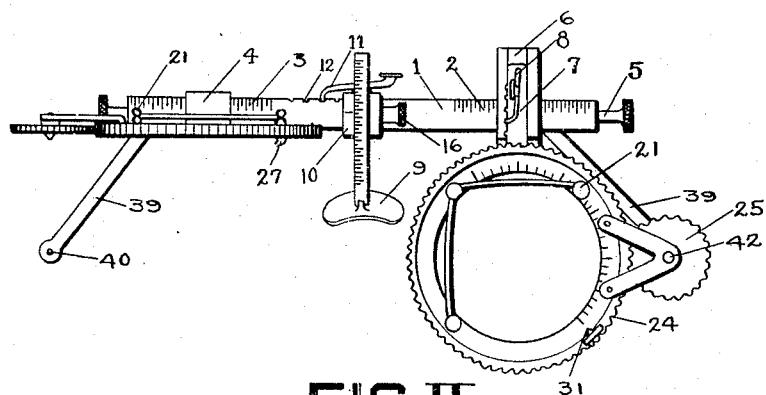
FIG. II
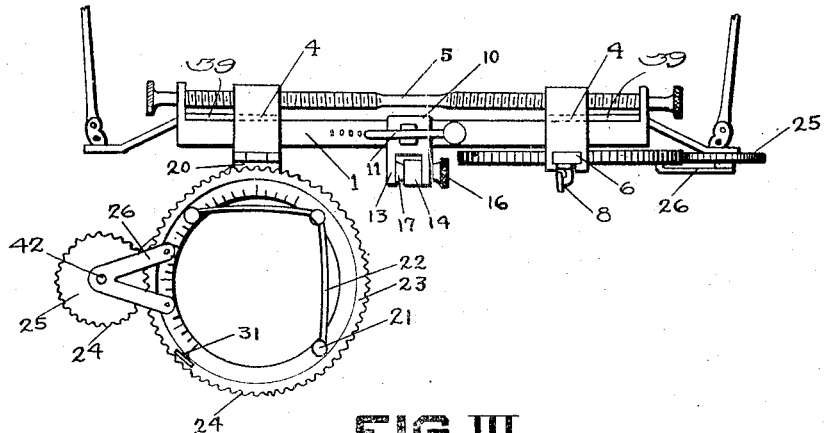
FIG. III
INVENTOR
H. K. PARSONS
BY
H. H. Styll & H. K. Parsons
ATTORNEYS July 14, 1925.
H. K. PARSONS
TRIAL FRAME
Filed July 29, 1919  2 Sheets-Sheet 2
1,545,847
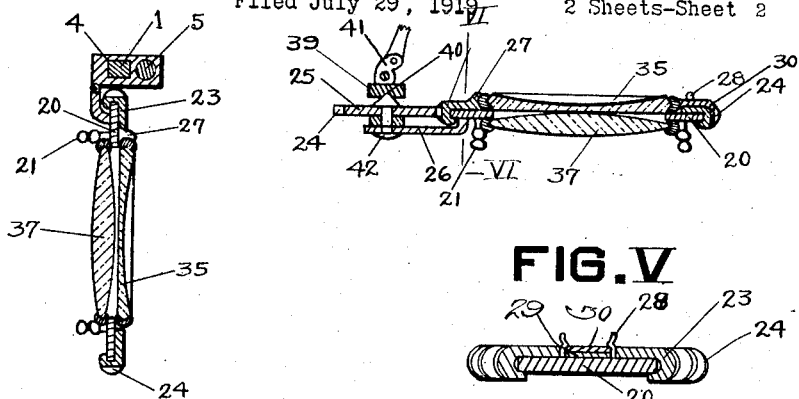
FIG. IV
FIG. V
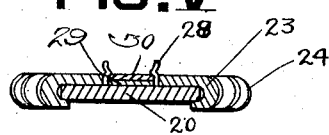
FIG. VI
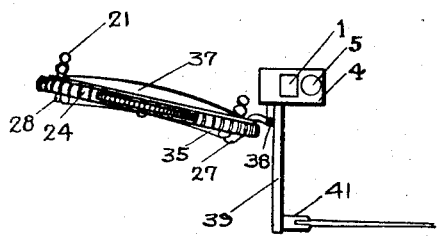
FIG. VII
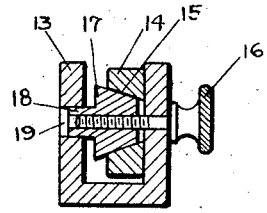
FIG. VIII
INVENTOR
H. K. PARSONS
BY
H. H. Styll  H. K. Parsons
ATTORNEYS Patented July 14, 1925.

1,545,847

UNITED STATES PATENT OFFICE.

HAROLD K. PARSONS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TRIAL FRAME.

Application filed July 29, 1919. Serial No. 314,053.

*To all whom it may concern:*

Be it known that I, HAROLD K. PARSONS, a citizen of the United States, residing at Southbridge, in the county of Worcester and State of Massachusetts, have invented certain new and useful Improvements in Trial Frames, of which the following is a specification.

This invention relates to improvements in that type of instrument known as a trial frame, or in other words, a frame adapted to support test lenses before the eye of a patient in proper relationship to the eye and to at the same time preferably designate or measure and determine the facial peculiarities and requirements of the wearer to facilitate the choice of properly fitting mounting to hold the lenses determined upon.

One of the leading objects of the present invention, therefore, is to secure an improved construction of frame which shall satisfactorily support and present the lenses before the eye of the patient and which shall be capable of new and novel adjustments to more readily facilitate the correct positioning or supporting of the lenses before the eyes and the more ready determination of the frame required.

A further object of the present invention is the provision of novel means for retaining the lenses in position in the frame, for facilitating the removal and replacement of the lenses, for holding the lenses in more correct or desirable relationship to the eye of the wearer, and to facilitate removal of the lenses from in front of the eye of the patient or their instant accurate replacement as desired.

Other objects and advantages of my improved construction should be readily apparent by reference to the foregoing specification taken in connection with the accompanying drawings, and it will be understood that I may make any modifications in the specific details of construction shown and described within the scope of the appended claims without departing from or exceeding the spirit of my invention.

Figure I represents a front view of my improved frame.

Figure II represents a rear view with one of the eyes in raised position.

Figure III represents a plan view of the construction shown in Figure II.

Figure IV represents a sectional view taken on the line IV—IV of Figure III.

Figure V represents a sectional view on the line V—V of Figure I.

Figure VI represents a sectional view on the line VI—VI of Figure V.

Figure VII represents an end view.

Figure VIII represents a sectional view on the line VIII—VIII of Figure I.

I am aware that prior to my present invention numerous relative adjustments of the several parts of a trial frame have been made, such as independent adjustment of the two eyes to take care of uneven spacing of the centers of the eyes from the bridge of the nose, and also that lens holders have been hinged to supporting bars so that they might be swung away from the eye. So far as I am aware, however, I am the first who has had the joint lateral adjustment of the two lens cells so that the pupillary distance may at all times be readily read from a suitable scale, and in place of independent adjustment have secured the necessary lateral bodily movement of the frame by providing a transversely adjustable nose rest, and I am also the first, so far as I am aware, to provide in combination with a hinged eye frame, means for definitely determining the position it will occupy with respect to the eye when swung down, and also am the first to provide the several novel and improved features and details of construction as hereinafter more fully described.

In the drawings, therefore, the numeral 1 designates the main cross bar support of my improved frame, which is provided with suitable scales 2 and 3 on its face to indicate respectively the pupillary distance and overall width of the frame at any particular adjustment. Mounted on this bar 1 are the guide slides or blocks 4 which may be engaged as by a suitable right and left thread adjusting screw 5 to shift them back and forth along the bar as desired. One of the blocks 4 is additionally provided with a vertical guide way 6 receiving the upper arm 7 of the lens cell, this carrying a suitable adjusting device, such as the spring latch member 8 interlocking with the block to hold it at different heights as desired. This adjustment is to take care of any possible difference in vertical placing of the two eyes on the face, just as the adjusting screw 5 moves the lens cells or holders in and out to exactly center them about the pupils of the eyes.

As before mentioned, however, it sometimes occurs that when the lens cells are set correctly according to the pupillary distance of the patient, one may be in a little and the other out a little, or the like, since the position of the frame in general on the face is controlled by the raising of the crest pad 9 on the bridge of the nose of the wearer and the eyes may be unequally spaced from this point. To facilitate adjustment of the frame, therefore, I mount centrally on the bar 1 the slide block 10, which is transversely movable on the bar and securable in transversely adjustable position by any suitable means, for purposes of illustration a readily mountable spring latch 11 cooperating with notches 12 on the surface of the bar 1 serving to hold the slide in transversely adjusted position. This slide block is preferably provided with the ears 13 projecting forwardly and having disposed therebetween the split arm 14, which preferably has a V-shaped corrugated groove communicating with the slot 15, while journaled for rotation in one of the ears 13 is the adjusting screw 16 extending into the cone 17 having an angular shank 18 non-rotatably engaged in the socket 19 in the opposite ear, this cone also having a corrugated surface. It will thus be seen that by loosening of the screw 16 the cone will be shoved backward or away from the member 14 and permit of either vertical or angular adjustment of the member 14 and the crest pad 9 carried thereby, as desired, while when moved into adjusted position tightening of the screw will force the cone into engagement with the V groove, when the two sets of corrugations will interlock and at the same time the parts will be clamped together to securely lock the crest pad in its desired position.

For the actual eye testing operation I preferably hinge to each of the slide blocks 4 the lens cell ring plate 20, which is in the form of a centrally opened disc, preferably provided with the fixed lens engaging pins 21 and the resilient lens retaining finger 22. Rotatably mounted upon this disc 20 by being cupped or pressed therearound is a second rotatable lens cell disc 23 for cylindrical lenses having its edge notched to provide the teeth 24 meshing with the control pinion gear or the like 25, which is carried by the brackets 26 secured to and projecting laterally from the disc 20. This disc is rotatable to carry cylindrical lenses in order that they may be placed at different axes before the eye of the patient, and is preferably provided with the lens retaining fingers 27 see Figure VII and with the spring fingers 28. It will be noted that these spring fingers 28 project outwardly from the cell instead of in a plane parallel with the cell, as in the case of the finger 22 just referred to. In use the cell is formed at one side with the notched or cut-away portion 29 see Figure V while the lens frame which is to be fitted in the rotatable cell is provided with a laterally projecting L-shaped handle portion 30 which extends out to the edge of the cell and has its L terminus fitting into the notch, as shown in Figures I and VI. The purpose of this interlocking construction is so that each cylindrical lens frame will be positively locked in predetermined relation to the rotating lens cell, there being a suitable pointer 31 on the cell cooperating with a degree scale 32 on the plate 20 to indicate the axis to which the cylinder lens has been rotated.

It is to be noted that in the construction just illustrated and described the cylinder lens 35 has been shown as disposed next to the eye of the wearer. This is particularly desirable, since a large percentage of lens corrections require the use of a convex lens, and with my improved construction the convex lens or lenses, as for instance 37, may be placed in the front of the frame, and the cylinder lens in the rear of the frame next to the eye, which in the event that a minus cylinder is used will give a concave curve toward the eye combined with a convex outer curve on the lens, and in this way there will be less aberration effects when looking obliquely through the test lenses, than are present when the convex side of the sphere is disposed toward the eye. Also with this form of construction the cylinder lens may be fitted and properly positioned while final subsequent tests are made with the spherical lenses without in any wise disturbing the cylinder. To facilitate removal of the various cylinder lenses I preferably form the supporting bracket for each cell with the hinge 38 so that the cell may be swung upward and away from the eyes of the wearer, as illustrated in Figure VII, for removal or replacement of the cylinder lens, or when it is desired to remove corrective effect from before the eyes of the patient.

To retain the frame in position on the face during the testing operation it is necessary that it be in some way connected with the head. I have preferably accomplished this by securing to the slide blocks 4 the bracket arms 39 terminating in the abutments 40 to which are pivoted the retaining temples 41. By reference to Figure V it will be further noted that the abutment 40 is adapted to receive the projecting end of the gear axle 42, the abutment 40 thus serving to limit the downward swinging movement of the lens cell and insuring its always being a predetermined distance from the eye for the same adjustment of the bridge or crest member and other portions of the frame.

I claim:

1. A trial frame including a support, a slide carried thereby, a lens cell hinged to the slide, a cylinder lens cell rotatably mounted on the rear of the lens cell, said cylinder cell having a portion peripherally overlying the main lens cell, the periphery of said overlying portion being notched to provide teeth.

2. A trial frame including a support, a slide carried thereby, a lens cell hinged to the slide, a cylinder lens cell rotatably mounted on the rear of the lens cell, said cylinder cell having a portion peripherally overlying the main lens cell, the periphery of the said overlying portion being notched to provide teeth, a bracket carried by the main cell, and means carried by the bracket and engaging the teeth for rotating the cylinder cell.

3. A combination cell for a trial frame including a ring plate, lens supporting means carried by the plate lens cell, additional, a second lens cell having a portion cupped over the ring plate to be rotatably supported thereby, and means on the rear of said cupped-over member for engaging a trial lens.

4. A combination cell for a trial frame including a ring plate lens cell, additional, lens supporting means carried by the plate a second lens cell having a portion cupped over the ring plate to be rotatably supported thereby, and means on the rear of said cupped-over member for engaging a trial lens, said cupped-over member having a peripheral portion removed to provide a trial lens handle engaging recess.

5. The combination with a trial frame, including a rotatable lens cell member having a portion cut away to provide a recess, of a trial lens frame carried by the rotatable member and having an L-shaped handle overlying the member and fitting into the recess to lock the parts against relative rotative movement.

6. A device of the character described including a supporting bar, a slide adjustable along said bar, a depending hinged lens cell carried by the slide and a depending brace member carried by the slide for engagement with the lens cell to limit its pivotal movement in one direction.

7. In a device of the character described the combination with a support, of a bracket carried thereby, a serrated cone nut slidably but non-rotatably mounted on the bracket, a nose rest arm having a bevelled serrated wall slot formed longitudinally thereof to receive the cone nut, and means on the bracket for moving the cone nut into and out of clamping engagement with the serrated slot wall for securing the nose rest arm in desired adjusted position.

8. In a device of the character described the combination with a support, of a bracket carried thereby, a serrated cone nut slidably but non-rotatably mounted on the bracket, a nose rest arm having a bevelled serrated wall slot formed longitudinally thereof to receive the cone nut, means on the bracket for moving the cone nut into and out of clamping engagement with the serrated slot wall for securing the nose rest arm in desired adjusted position, there being a sliding connection between the bracket and its support, and means for locking the bracket in desired adjusted position along the support.

9. In a device of the character described, the combination with a cross bar, of a slide block carried by the cross bar, a depending arm carried by the slide block and provided with an abutment, and a lens cell hinged to the slide block and limited in its movement by engagement with the abutment.

10. A trial frame including a supporting bar, a slide adjustable along said bar, a depending hinged lens cell carried by the slide and a depending brace member carried by the slide for engagement with the lens cell to limit its pivotal movement in one direction, and a head retaining member for the frame carried by the brace member.

11. In a device of the character described, a supporting bar having serrations intermediate of its ends, a slide on the bar, a nose rest on the slide, and a latch on the slide adapted to engage the serrations on the bar to hold the slide in desired position intermediate the ends of the bar.

In testimony whereof I have affixed my signature, in presence of two witnesses.

H. K. PARSONS.

Witnesses:
H. E. COLEMAN,
ESTHER M. LAFLER.